(12) United States Patent
Nishigaki et al.

(10) Patent No.: US 6,276,691 B1
(45) Date of Patent: Aug. 21, 2001

(54) OIL SEAL

(75) Inventors: Takayuki Nishigaki, Fukushima; Akira Yamaguchi, Fukushim, both of (JP)

(73) Assignee: NOK Corporation, Tokyo (JP)

( * ) Notice: Subject to any disclaimer, the term of this patent is extended or adjusted under 35 U.S.C. 154(b) by 0 days.

(21) Appl. No.: 09/259,257

(22) Filed: Mar. 1, 1999

(30) Foreign Application Priority Data

Feb. 27, 1998 (JP) .................................................. 10-061974

(51) Int. Cl.[7] .................................................. F16J 15/32
(52) U.S. Cl. .................................................. 277/353; 264/161
(58) Field of Search .................................................. 277/353, 381, 277/394, 400, 402; 264/151

(56) References Cited

U.S. PATENT DOCUMENTS

| | | | |
|---|---|---|---|
| 3,930,655 | * | 1/1976 | Fern .................................. 277/400 X |
| 3,973,781 | * | 8/1976 | Grorich .............................. 277/400 X |
| 4,288,083 | * | 9/1981 | Braconier . | |
| 5,759,466 | | 6/1998 | Onuma et al. . | |

FOREIGN PATENT DOCUMENTS 7-301339    11/1995    (JP) .

\* cited by examiner

Primary Examiner—Robert J. Sandy
Assistant Examiner—Karlena D. Schwing
(74) Attorney, Agent, or Firm—Jacobson Holman, PLLC

(57) ABSTRACT

Oil seals having, on an inner periphery thereof, a flat surface with a first predetermined shape helical pumping ribs, is provided. The oil seals have an excellent sealing properties for a long time of period as well as its initial stage in use. The oil seals further have a second helical pumping ribs on its frustoconical air-side surface, giving the oil seals a long life pumping property even after the first helical pumping ribs disappear from the flat surface.

10 Claims, 12 Drawing Sheets

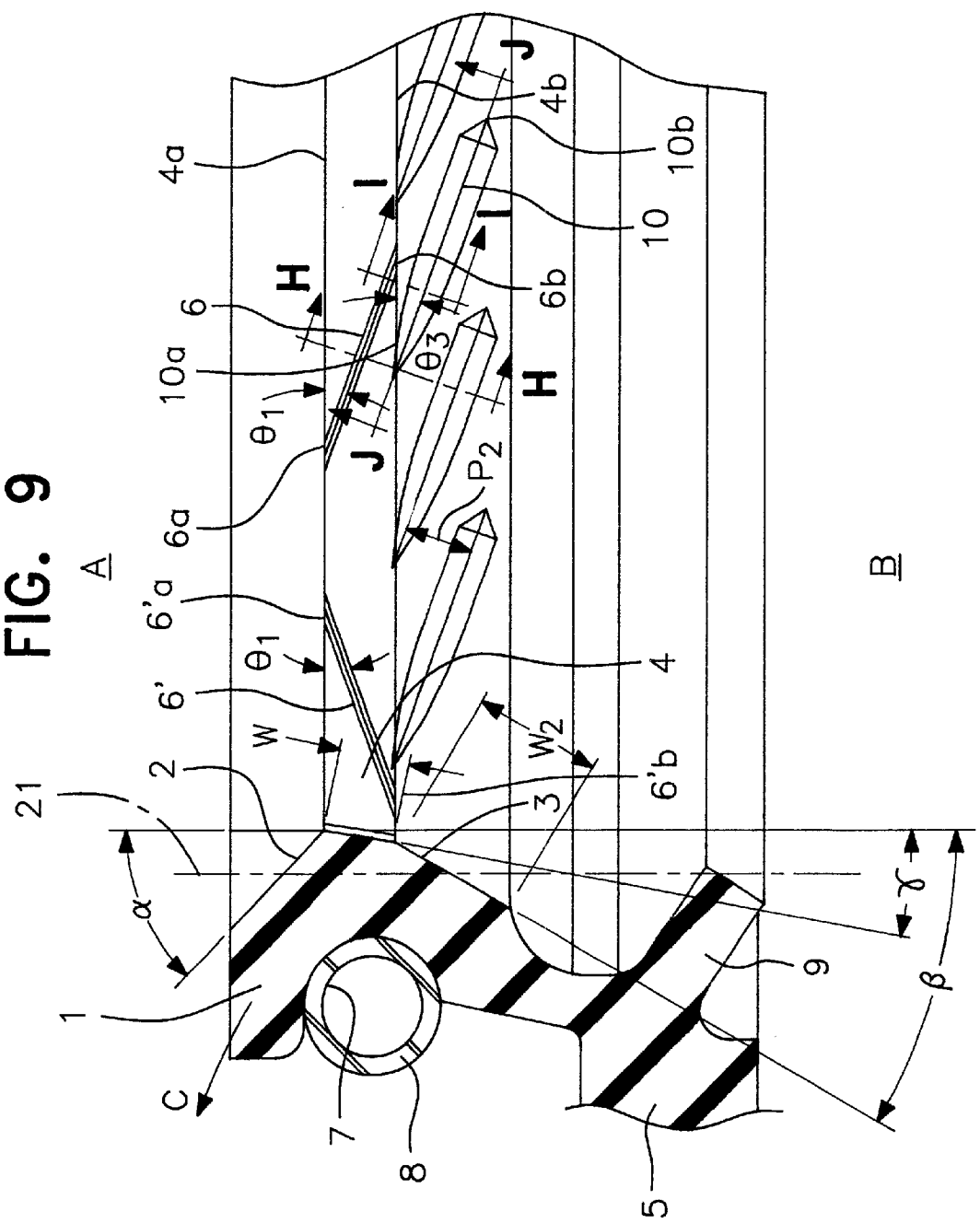

OIL SEAL

BACKGROUND OF THE INVENTION

1. Field of the Invention

The present invention relates to oil seals for establishing a seal between relatively movable shaft and housing. More particularly, the present invention relates to lip-type oil seals having hydrodynamic pumping means, which is used in an automobile or in a general industrial machinery.

2. Description of the Prior Art

Conventionally, as shown in FIG. 15, there has been known an oil seal having helical pumping ribs 52 at around a tip portion of a seal lip 51 to improve seal functions. The pumping ribs provide oil seals with a pumping function to pump fluid to be sealed toward fluid side. This type of oil seals has a sharp edge 53 at a tip of the seal lip 51, and the helical pumping ribs 52 starts from the sharp edge 53.

The sharp edge 53, however, tends to be abraded comparatively rapidly by sliding on a member to be sealed such as a shaft (not shown in FIG. 15).

Therefor, in these conventional oil seals mentioned above, the tip of the helical pumping ribs 52 tend to be comparatively rapidly disappeared with comparatively rapidly being abraded at the sharp edge 53, causing changes of contact conditions of the helical pumping ribs 52 with the member to be sealed.

Accordingly, there have been a defect of comparatively rapidly decrease in pumping function of the helical pumping ribs 52, by comparatively rapidly abrasion phenomenon mentioned above.

Japan unexamined laid open patent 7-301339 discloses an oil seal having, in the seal lip 101, a third frustoconical surface (so called a "flat" surface) 106 between a frustoconical air-side surface 103 and a frustoconical oil-side surface 102 (as is shown in FIG. 16) to avoid such a defect as described above. There are an edge line 104 and 107, which is a juncture line between the flat surface 106 and the frustoconical oil-side surface 102, and between the flat surface 106 and the frustoconical air-side surface 103, respectively as shown in FIG. 16. As is shown in FIG. 16, the flat surface has a width W in actual size, which is a width in the direction of a central axis line 0 of the oil seal. The oil seal also has angles a, β, and γ as is shown in FIG. 16; the α, β and γ is an angle between the central axis of the oil seal and the frustoconical oil-side surface 102, the frustoconical air-side surface 103, and the so-called flat surface 106, respectively. The patent of 7-301339 also discloses uniform helical grooves providing the seal lip with a pumping function pumping oil (or fluid, not shown in FIG. 16) back from the air-side to the oil-side. In this regard, the terms "oil-side" and "air-side" refer, respectively, to being situated closer to the oil-side A and the air-side B indicated in FIG. 16.

The oil seal also has a garter spring 105 placed in a groove formed on an outer periphery of the seal lip 101, and a rigid annular casing 108 which supports the seal lip 101 in the lower part of the oil seal, as is shown in FIG. 16.

The 7-301339 patent, however, has such a wider projection area which is placed between a groove and an another adjacent groove, that a deformation of the groove is not so large at the time when the third frustoconical surface is fitted on a member (or shaft, not shown in FIG. 16) to be sealed. This type of oil seals show sometimes some disadvantages such as some oil leakage from the oil-side A to the air-side B through a portion between the seal lip and the member (shaft) to be sealed, at the time of the state that there is no relative rotational movement between the seal lip and the member (shaft) to be sealed, because of the groove being usually little deformed to cause some apertures between the seal lip and the shaft.

SUMMARY OF THE INVENTION

It is therefore that, from the view point mentioned above, an object of the present invention is to provide an oil seal having a property not to be decreased in pumping function of the ribs at around the edge of the seal lip in its long use, and having an excellent sealing property even at the time there is no relative movement between the seal lip and the shaft, resulting an excellent sealing properties for a long period of time as well as at an initial stage in use.

Another object of the present invention is to provide an oil seal having an improved wearability.

A still another object of the present invention is to provide an oil seal having a static and dynamic sealing performance.

A still another object of the present invention is to provide an oil seal having an improved hydrodynamic pumping function even at the time of the counter member to be sealed is counterrotated.

These objects are achieved by providing a third annular substantially frustoconical (or flat) surface between a frustoconical air-side surface and a frustoconical oil-side surface of a seal lip, and providing a plurality of helical pumping ribs on the third annular flat surface to pump back oil in the sliding portion of the seal lip, to the oil-side. The cross-sectional shape of each ribs provided on the third annular flat surface, are similar to a triangular or bilge or mountainous shape in its cross section and the height of the ribs are uniformly controlled throughout its entire length.

Each ribs is formed from the edge on the oil (or fluid) side to another edge on the air-side of the third annular flat surface with a predetermined crisscross angle θ to an edge line, which is a juncture line between the third annular flat surface and the frustoconical oil-side surface. These first ribs are placed equally around the surface of the third surface.

Some of the first ribs can be placed equally around the surface of the third surface with a predetermined crisscross angle (180° minus θ or 180-θ) to the edge line, so as to prevent oil from leaking at the time of reverse revolution of the shaft. Each first ribs do not cross over each other.

These first helical ribs mentioned above are designed to be deformed when the seal lip 1 is mounted on the shaft, so that the third surface having the first helical ribs is snugly fitted on the shaft to prevent oil from leaking through the portion between the shaft and the third surface at the time there is no relative movement between the shaft and the third annular flat surface.

And also these objects are achieved by further providing a second helical pumping ribs on the frustoconical air-side surface. Each second helical pumping ribs have a bilge type or a triangular type in cross section thereof. And the height and the width of the second pumping ribs, at least partially, progressively increases from the oil-side to the air-side.

These second ribs are placed equally around the surface of the frustoconical air-side surface with a predetermined crisscross angle to an edge line, which is a juncture line of the third annular flat surface and the frustoconical air-side surface. These features and advantages of the invention, as well as other features and advantages thereof, will become apparent from the following description.

BRIEF DESCRIPTION OF THE DRAWING

FIG. 9 is a fragmentary cross-sectional view showing another embodiment of oil seal made according to the present invention;

DESCRIPTION OF THE PREFEREED EMBODIMENT

The present invention will now be explained in more detail by referring to Figures.

First Embodiment

Figure 1:
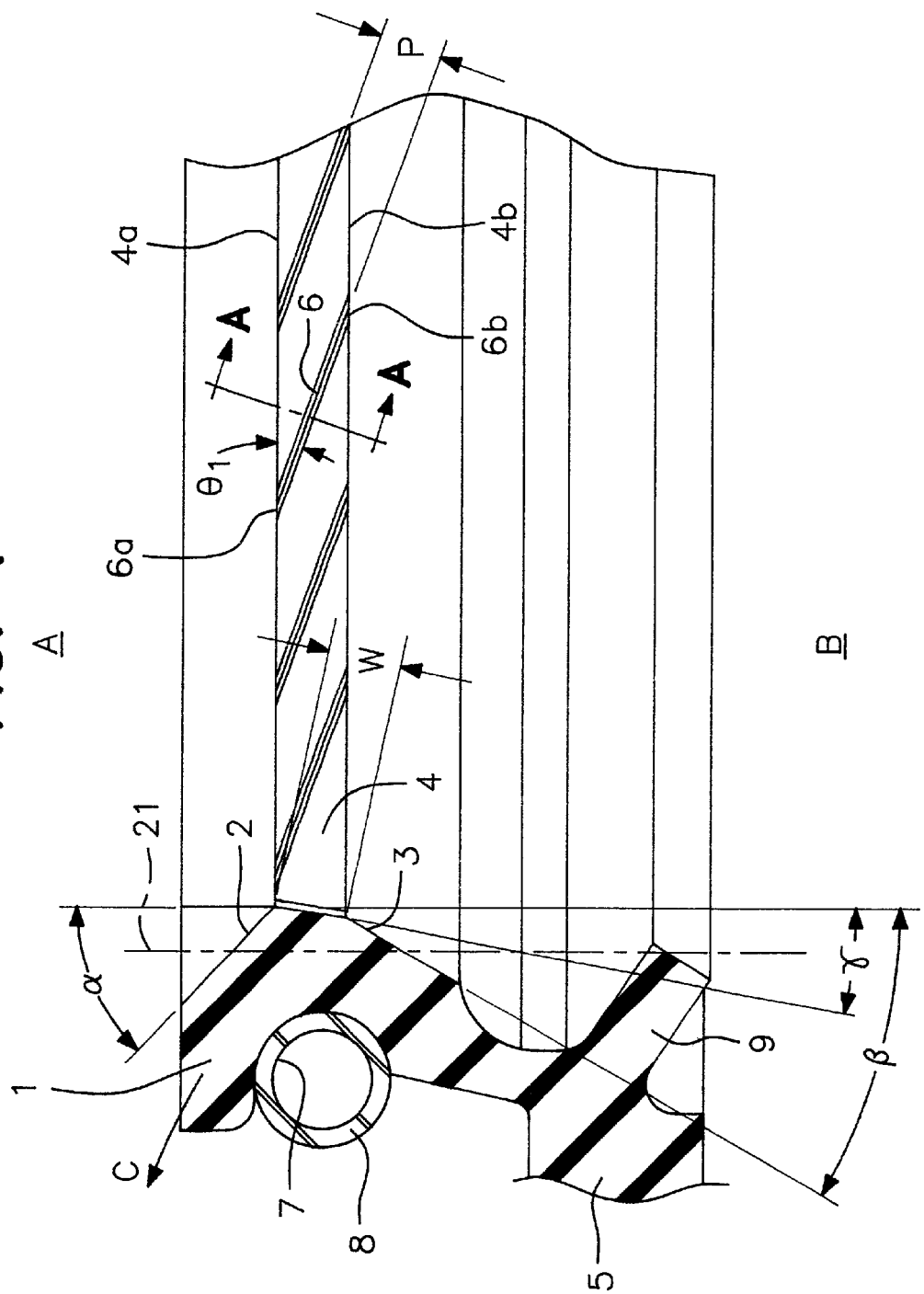
FIG. 1 is a fragmentary cross-sectional view showing the oil seal made according to the present invention.

Referring to FIG. 1, a frustoconical oil-side surface 2, a frustoconical air-side surface 3, and a third annular substantially frustoconical (or flat) surface 4 placed between the frustoconical oil-side surface 2 and the frustoconical air-side surface 3 are provided in the tip (inner periphery) of the seal lip 1. There are annular edge lines 4a and 4b, which are defined by the frustoconical oil-side surface 2 and the third flat surface 4, and, the frustoconical air-side surface 3 and the third flat surface 4, respectively. The diameter of the frustoconical oil-side surface 2 gradually increases from an air-side B to an oil-side A. On the other hand the diameter of the frustoconical air-side surface 3 gradually increases from the oil-side A to the air-side B. The third annular flat surface 4 has a predetermined width W and slidably and sealingly contacts with a member (shaft) 21 to be sealed by the seal lip 1.

A conventional garter spring 8 is mounted within a spring groove 7 formed on the outer periphery of the seal lip 1. There is also a conventional dust lip 9 to prevent from entering contamination from the air-side B.

In FIG. 1, the flat surface 4 is shown like a frustoconical surface having a diameter thereof gradually increasing from the oil-side A to the air-side B. This configuration depends on the fact that the oil seal is not fitted on the member (shaft) 21, so the seal lip 1 is in a free state. When the oil seal is fitted on the shaft 21 to be sealed, the seal lip 1 is moved toward C axis around a support portion 5, which is supported by a rigid annular casing (not shown), by the interference between the shaft 21 and the seal lip 1 in FIG. 1, thereby resulting a fully contact of the whole surface 4 with the shaft 21 to bring the frustoconical shape of the surface 4 into a cylindrical (or flat) shape.

According to the experiments of the present invention, in the free state, each preferable angle of $\alpha$, $\beta$ and $\gamma$, which are shown in FIG. 1, are as follows. A preferable angle a between the central axis of the oil seal and the frustoconical oil-side surface 2 was in the range of about 40° to 60°, a preferable angle $\beta$ between the central axis of the oil seal and the frustoconical air-side surface 3 was in the range of about 15° to 30°, a preferable angle $\gamma$ between the central axis of the oil seal and the third flat surface 4 was in the range of about 5° to 15°, as shown in FIG. 1. When an oil seal having an inside peripheral diameter of the seal lip 1 of 33 mm was used, the width W of the third flat surface 4 in the direction of the central axis of the oil seal was preferably about 0.1 mm to 1.5 mm in actual size. A width of the third flat surface can be made wider with increasing an inside diameter of a seal lip 1 of an oil seal.

On the third flat surface 4, first helical ribs 6 to pump oil (or fluid, not shown in FIG. 1) back to the oil-side A are integrally formed, on and with the third flat surface 4, in a parallel manner relative to each other, and placed at about even intervals relative to each other on around the third flat surface, as shown in FIG. 1. One end portion 6a of the first helical ribs 6 start from around the edge line 4a and extend toward the edge line 4b aslant the third flat surface to reach at the other end portion 6b at around the edge line 4b. It is more desirable, for securing better pumping function of the helical ribs, that each end portions 6a and 6b is on the edge line 4a and 4b respectively. When the first helical ribs start far from the edge line 4a or reach to far from the edge line 4b, pumping function to pump oil back to the oil-side A can not be fully secured.

The angle $\theta1$ between the edge line 4a and the ribs, as shown in FIG. 1, is in the range of about 10° to 45°, preferably of about 15° to 40°. In the case the angle is not more than about 10°, there is often some oil (or fluid) leakage from the oil-side A to the air-side B through the portion between the shaft 21 and the third flat surface 4 at the time of reverse revolution of the shaft 21. On the other hand the angle is not less than about 45°, the pumping function to pump oil back to the oil-side A often becomes smaller even at the time of normal revolution of the shaft 21.

Figure 2:
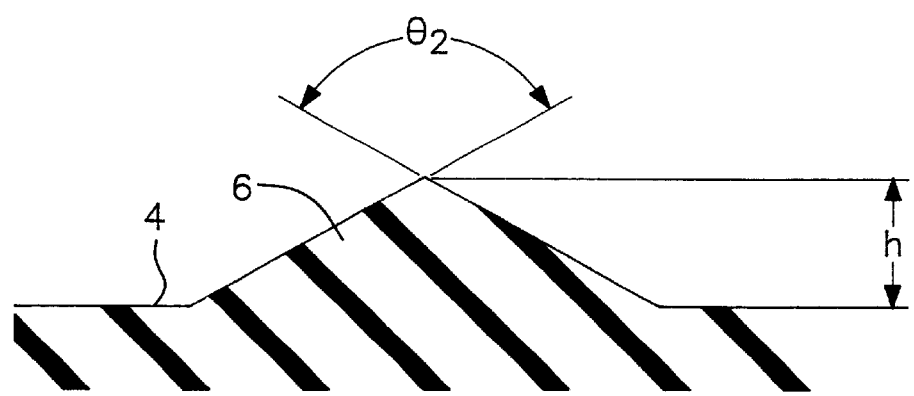
FIG. 2 is a cross-sectional view showing the first rib taken along the line A—A of FIG. 1.

The shape of the first helical ribs can be, for example, a mountainous or a bilge or a triangular shape in cross section of A—A line in FIG. 1, however triangular shape which is shown in FIG. 2, is preferable.

When rectangular form type ribs with approximately same base length and height as that of a triangular type ribs were provided instead of a triangular type or the like mentioned above, on the third flat surface, there often occurred some oil leakage through, at the time that the shaft was not driving, the portion between the seal lip and the shaft 21. Probably there might be a small clearance, which might cause oil leakage, near the base of the rectangular ribs on the third flat surface probably due to lesser deformation in the rectangular ribs when the seal lip was mounted on the shaft 21.

The top opening angle θ2 of the substantially triangular shaped ribs 6, as shown in FIG. 2, is in the range of about 90° to 150°, preferably in the range of 100° to 140°.

The first helical ribs have a predetermined controlled height throughout the length, as measured from the third flat surface 4, and the range of the height h, which is shown in FIG. 2, is about 0.005 mm to 0.1 mm, preferably 0.005 mm to 0.08 mm. When the height of the ribs h is not more than 0.005 mm, pumping function to pump oil back to the oil-side A is small. On the other hand the height of the ribs h is not less than 0.1 mm, there is often some oil leakage through the portion between the third flat surface 4 and the shaft 21 at the time the shaft is not driving, or at the time the shaft is rotating in reverse revolution.

The pitch p is a predetermined distance of the helical ribs relative to each other as shown in FIG. 1.

One of the examples of the first helical ribs of the first embodiment of the present invention is as follows;

Inner diameter of the seal lip: 33 mm

Width W of the third flat surface: 0.5±0.2 mm

Configuration of the ribs: triangular,

Angle θ1 of the ribs with the edge 4a: 30±2°,

Height h of the ribs: 0.010±0.005 mm

Top opening angle θ2 of the top of the ribs: 120±5°,

Pitch of the helical ribs relative to each other: 1.04±0.1 mm, and

The number of the ribs: 50.

Seal lip of the present invention is usually made of elastic compounds including rubber like materials and fillers.

When the oil seal having such a configuration as mentioned above is fitted on the outer periphery of the shaft 21, the third flat surface 4 sealingly contacts, with predetermined width W in the direction of the axis of the shaft 21, with the outer surface of the shaft 21. Thereby, relatively large contact area with the shaft 21 can be attained by the existence of the flat surface 4, bringing contact pressure per unit area of the third flat surface into relatively low. This contact condition is just like one that can be attained after the conventional seal lip without the third flat surface is used on and abraded by the shaft 21, after a sufficient operating time, to give a fully (saturatedly) abraded seal lip. Thereby further abrasion of the third flat surface by the shaft 21 is not likely to be occurred easily, and a stable and snug contact condition between the flat surface and the shaft 21 can be attained, resulting in a good sealing condition and a less abrasion rate per unit time.

Furthermore, as the first pumping helical ribs 6, which have a property to pump oil back to the oil-side A, are provided on the third flat surface 4 having an excellent anti-abrasion property due to its configuration mentioned above, the first helical ribs are also difficult to be abraded, thereby pumping function by the first helical ribs can be maintained for a long period of time in use.

From above mentioned reasons, preventing pumping property of the third helical ribs from being deteriorated for even a relatively long period of time in use can be achieved, thereby excellent sealing property of this type of oil seals can be maintained for a long period of time as well as an initial stage in use.

It is also possible that all or some of the first helical ribs 6 can be placed in a reverse direction with an angle (namely 180-θ1) to the edge line 4a. If some of the first helical ribs 6 is placed in a reverse direction relative to the rest of the first helical ribs, pumping function can be effectively secured even when the shaft 21 rotates in reverse direction. And each of all these first helical ribs does not cross over relative to each other.

Second Embodiment

Figure 3:
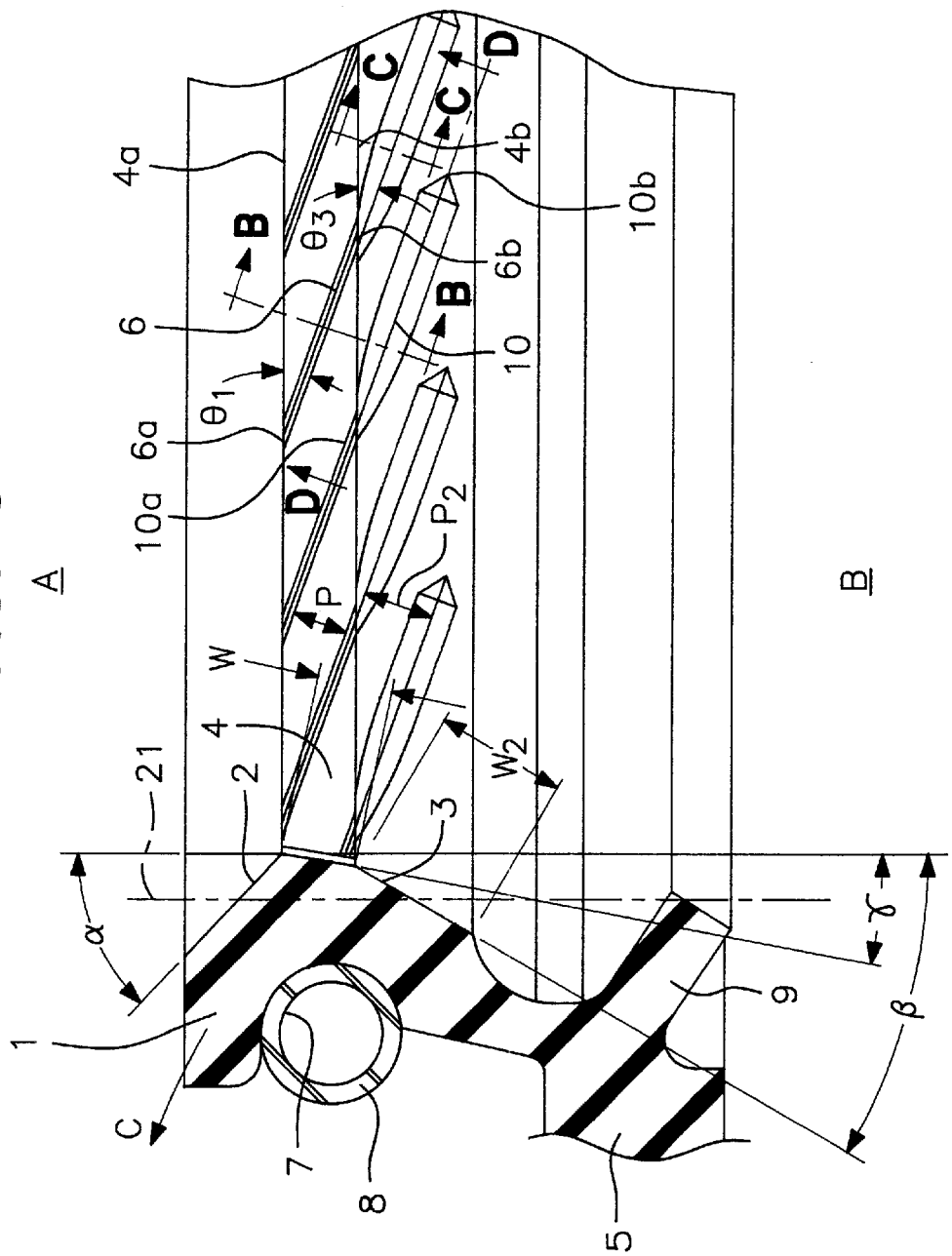
FIG. 3 is a fragmentary cross-sectional view showing another embodiment of the oil seal made according to the present invention.

FIGS. 3, 4, 5A and 5B show second embodiment of the present invention. Same reference numerals are used as in FIG. 1 and in FIG. 2, except some reference numerals. As shown in FIG. 3, in the tip (inner peripheral portion) of the seal lip 1, a frustoconical oil-side surface 2, inner diameter of which gradually increases toward oil-side A, a frustoconical airside surface 3, inner diameter of which gradually increases toward air-side B, are provided. Between both surfaces 2 and 3, a third substantially frustoconical (or flat) surface 4 having a predetermined width W in the direction of the axis of the oil seal in actual size. The third flat surface 4 sealingly engages with the shaft 21 in use.

In the FIG. 3, the flat surface 4 is shown, as is mentioned above in the first embodiment, like a frustoconical surface having a diameter thereof gradually increasing from the oil-side A to the air-side B. This configuration depends on the fact that the oil seal is not fitted on the member (shaft) 21, so the seal lip 1 is in a free state. When the oil seal is fitted on the shaft 21 to be sealed, the seal lip 1 is moved toward C axis around a support portion 5, which is supported by a rigid annular casing (not shown), by the interference between the shaft 21 and the seal lip 1 in FIG. 3, thereby resulting a fully contact of the whole flat surface 4 with the shaft 21 to bring the frustoconical shape of the flat surface 4 into a cylindrical (or flat) shape.

According to the experiments of the present invention, in the free state, each preferable angle of α, β and γ, which are shown in FIG. 3, is as follows as is mentioned in the first embodiment. A preferable angle α between the central axis of the oil seal and the frustoconical oil-side surface 2 was in the range of about 40° to 60°, a preferable angle β between the central axis of the oil seal and the frustoconical air-side surface 3 was in the range of about 15° to 30°, a preferable angle γ between the central axis of the oil seal and the third flat surface 4 was in the range of about 5° to 15°, as is shown in FIG. 3. When an oil seal having an inside peripheral diameter of the seal lip 1 of 33 mm was used, the width W of the third flat surface 4 in the direction of the central axis of the oil seal was preferably about 0.1 mm to 1.5 mm in actual size. A width of the third flat surface may be made wider with increasing an inside diameter of a seal lip 1 of an oil seal.

On the third flat surface 4, first helical ribs 6 to pump oil back (or fluid, not shown) to the oil-side A are formed, integrally with and on the third flat surface 4, in a parallel manner relative to each other, and placed at about even intervals relative to each other on around the third flat surface, as shown in FIG. 3. One end portion 6a of the first helical ribs 6 start at around the edge line 4a and extend toward the edge line 4b aslant the third flat surface to reach to the other end portion 6b at around the edge line 4b. It is more desirable, for securing better pumping function of the helical ribs, that each end portions 6a and 6b is on the edge line 4a or 4b respectively. When the first helical ribs start far from the edge line 4a or reach far from the edge line 4b, pumping function to pump oil back to the oil-side A can not be fully secured.

The angle θ1 between the edge 4a and the ribs, as shown in FIG. 3, is in the range of about 10° to 45°, preferably of about 15° to 40°. In the case the angle is not more than about 10°, there is often some oil (or fluid) leakage from the oil-side A to the air-side B through the portion between the shaft 21 and the third flat surface 4 at the time of reverse revolution of the shaft 21.

It is also possible that all or some of the first helical ribs 6 can be placed in a reverse direction with an angle (namely 180-θ1) to the edge line 4a. If some of the first helical ribs 6 is placed in a reverse direction relative to the rest of the first helical ribs, pumping function can be effectively secured even when the shaft 21 rotates in reverse direction.

And each of all these first helical ribs does not cross over relative to each other.

Figure 4:
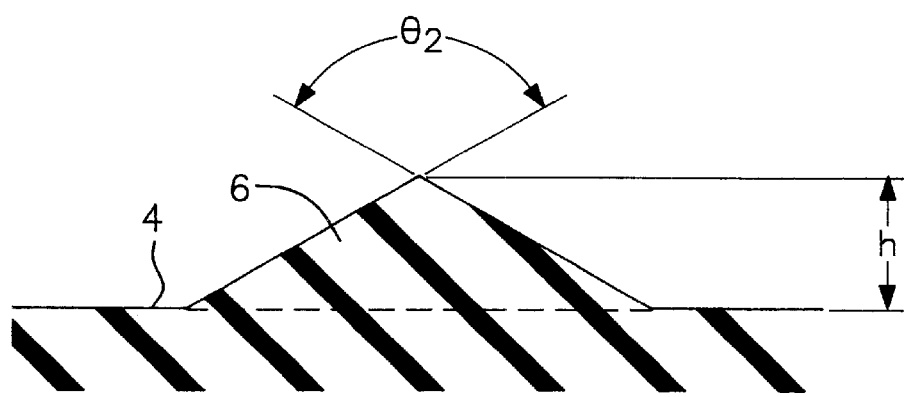
FIG. 4 is a cross-sectional view similar to FIG. 2, showing the first rib taken along the line B—B of FIG. 3.

The shape of the first helical ribs can be, for example, a mountainous or a bilge or a triangular shape in cross section of B—B line in FIG. 3, however triangular shape which is shown in FIG. 4, is preferable.

When rectangular type ribs with approximately same base length and height as that of a triangular type ribs were provided instead of a triangular type or the like mentioned above, on the third flat surface, there often occurred some oil leakage through, at the time that the shaft was not driving, the portion between the seal lip and the shaft 21. Probably there might be a small clearance, which might cause oil leakage, near the base of the rectangular ribs on the third flat surface, probably due to lesser deformation in the rectangular ribs when the seal lip was mounted on the shaft 21.

The top opening angle θ2 of the substantially triangular shaped ribs 6, as shown in FIG. 4, is in the range of about 90° to 150°, preferably in the range of 100° to 140°.

The first helical ribs have a predetermined controlled height throughout its length, as measured from the third flat surface 4, and the range of the height h, which is shown in FIG. 2, is about 0.005 mm to 0.1 mm, preferably 0.005 mm to 0.08 mm. When the height of the ribs h is not more than 0.005 mm, pumping function to pump back oil to the oil-side A is small. On the other hand the height of the ribs h is not less than 0.1 mm, there is often some oil leakage through the portion between the third flat surface 4 and the shaft 21 at the time the shaft is not driving, or at the time the shaft is rotating in reverse revolution.

The pitch p is a predetermined distance of the helical ribs relative to each other as shown in FIG. 3.

One of the example of the first helical ribs of the second embodiment of the present invention is as follows;

Inner diameter of the seal lip: 33 mm

Width W of the third flat surface: 0.5±0.2 mm

Configuration of the ribs: triangular,

Angle θ1 of the ribs with the edge 4a: 30±2°,

Height h of the ribs: 0.010±0.005 mm

Top opening angle θ2 of the top of the ribs: 120±5°,

Pitch of the helical ribs relative to each other: 1.04±0.1 mm, and

The number of the ribs: 50.

Furthermore, on the frustoconical air-side surface 3, mountainous or bilge or triangular C—C line cross sectional shaped helical pumping ribs 10 having a pumping function to pump oil (or fluid, not shown) back to the oil-side A are provided, integrally with the frustoconical air-side surface, in a parallel manner relative to each other, and placed at about even intervals relative to each other on and around the frustoconical air-side surface 3, as shown in FIG. 3. This second helical pumping ribs provide, also, the seal lip 1 with a further pumping function to pump oil back to the oil-side A, similar to the first helical pumping ribs 6 on the third flat surface 4. Furthermore, the second helical pumping ribs provide the seal lip 1 with a pumping function even after the first helical pumping ribs disappeared, in the case of heavy abrasion by the shaft 21, from the third flat surface 4, giving the seal lip 1 a more stable pumping function for a long time as well as its initial stage in use.

Figure 5A:
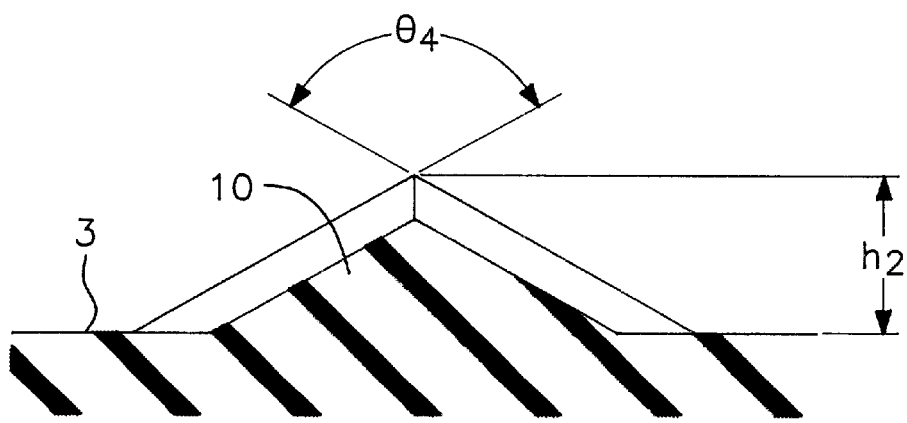
FIG. 5(A) is a cross-sectional view showing the second rib taken along the line C—C of FIG. 3.
Figure 5B:
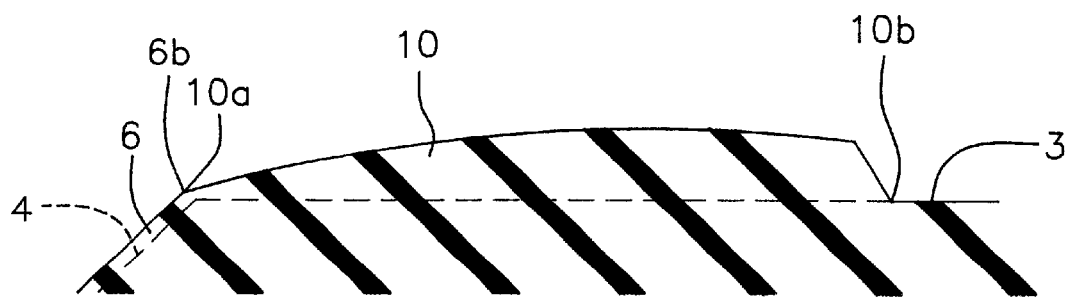
FIG. 5(B) is a cross-sectional view showing the first and the second rib taken along the line D—D of FIG. 3.

Each one end portion 10a of the second helical ribs 10 starts at and integrally connects with the end portion 6b of the first helical ribs 6, near the third flat surface 4 as shown in FIG. 3 and FIG. 5B; and extends toward the air-side B, with gradually increasing in height and width at least at an initial portion near the edge line 4b. When the second helical ribs start at far from the edge line 4b, the good pumping function to pump oil back to the oil-side A can not be sometimes obtained. And the end portion 10b of the second helical ribs 10 is located within, and at near the edge of the air-side of, the frustoconical air-side surface 3, as shown in FIG. 3.

The second helical ribs are also placed aslant the width W2 of the frustoconical air-side surface 3.

The angle θ3 between the edge line 4b and the central line of the long direction of the second helical ribs 10, as shown in FIG. 3, is in the range of about 10° to 45°, preferably of about 15° to 40°. In the case the angle θ3 is not more than about 10°, there often shows a small additional pumping function other than the pumping function by the first helical ribs 6, at the early stage in use as well as after the long period in use. On the other hand when the angle θ3 is not less than about 45°, the additional pumping function other than the pumping function by the first helical ribs 6 often becomes small.

It is also possible that the second helical ribs 10 are placed in a reverse direction with an angle (namely 180-θ3) to the edge line 4b, when the first helical ribs 6 are placed in a reverse direction with an angle (namely 180-θ1) to the edge line 4a.

Figure 12:
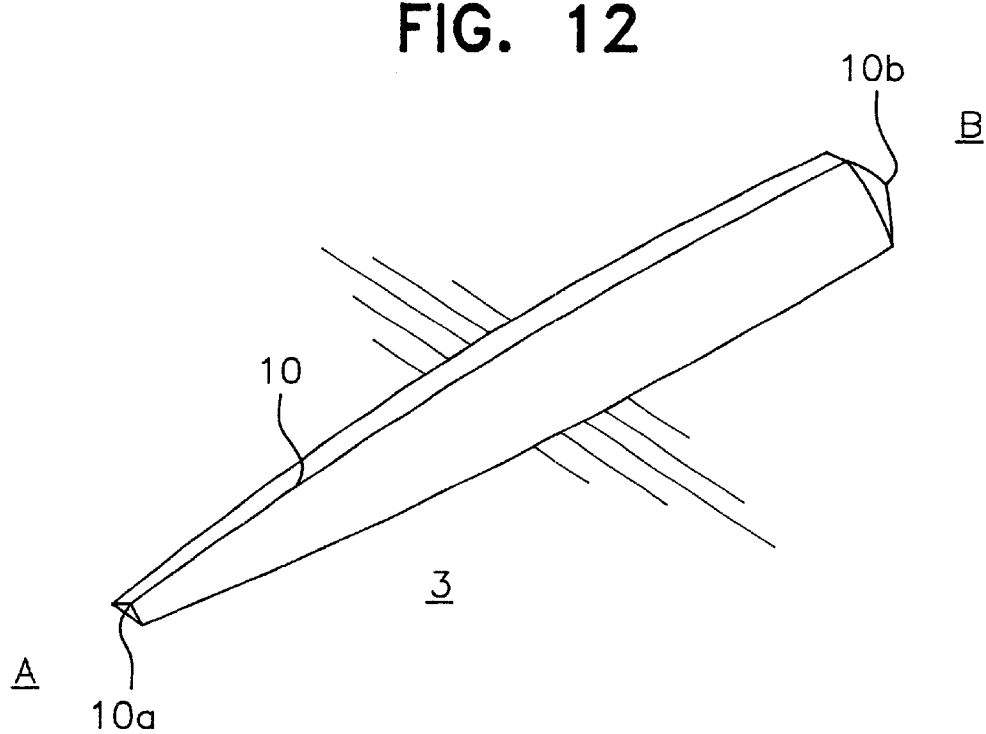
FIG. 12 is a perspective view showing the bilge-type second rib placed on the frustoconical air-side surface in FIG. 3.
Figure 13:
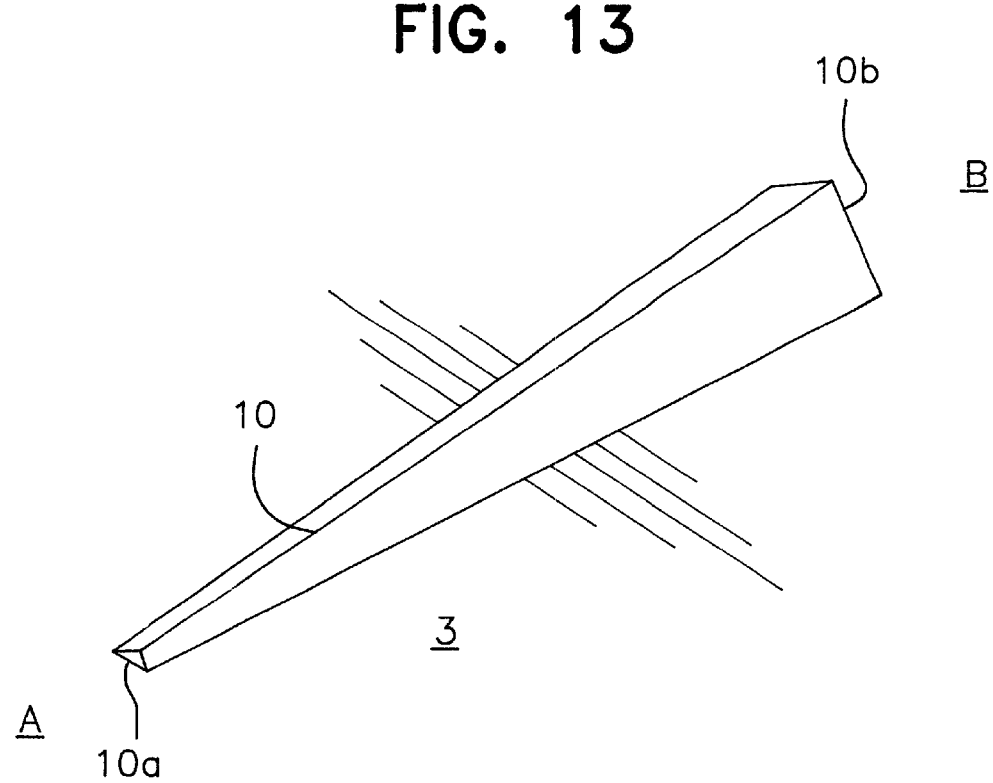
FIG. 13 is a perspective view showing another embodiment of the second rib, the cross-sectional shape thereof is similar to a triangular shape.
Figure 14:
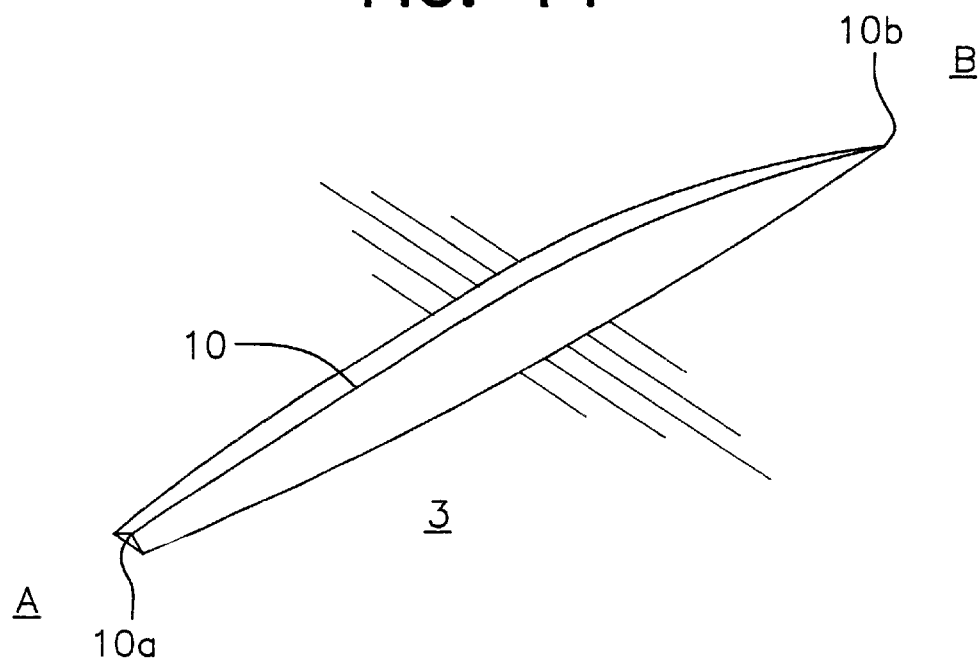
FIG. 14 is a perspective view showing another embodiment of the second rib, the shape is approximately symmetrical with respect to the long direction.
Figure 15:
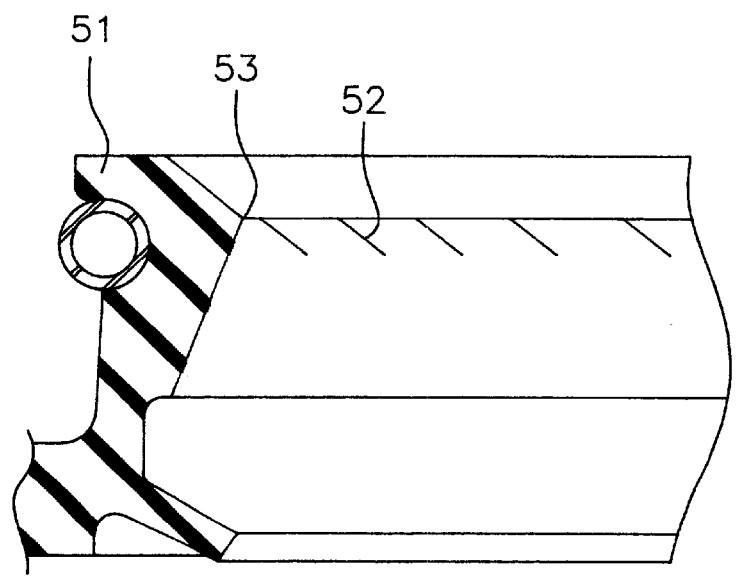
FIG. 15 is a fragmentary cross-sectional view showing a conventional oil seal.
Figure 16:
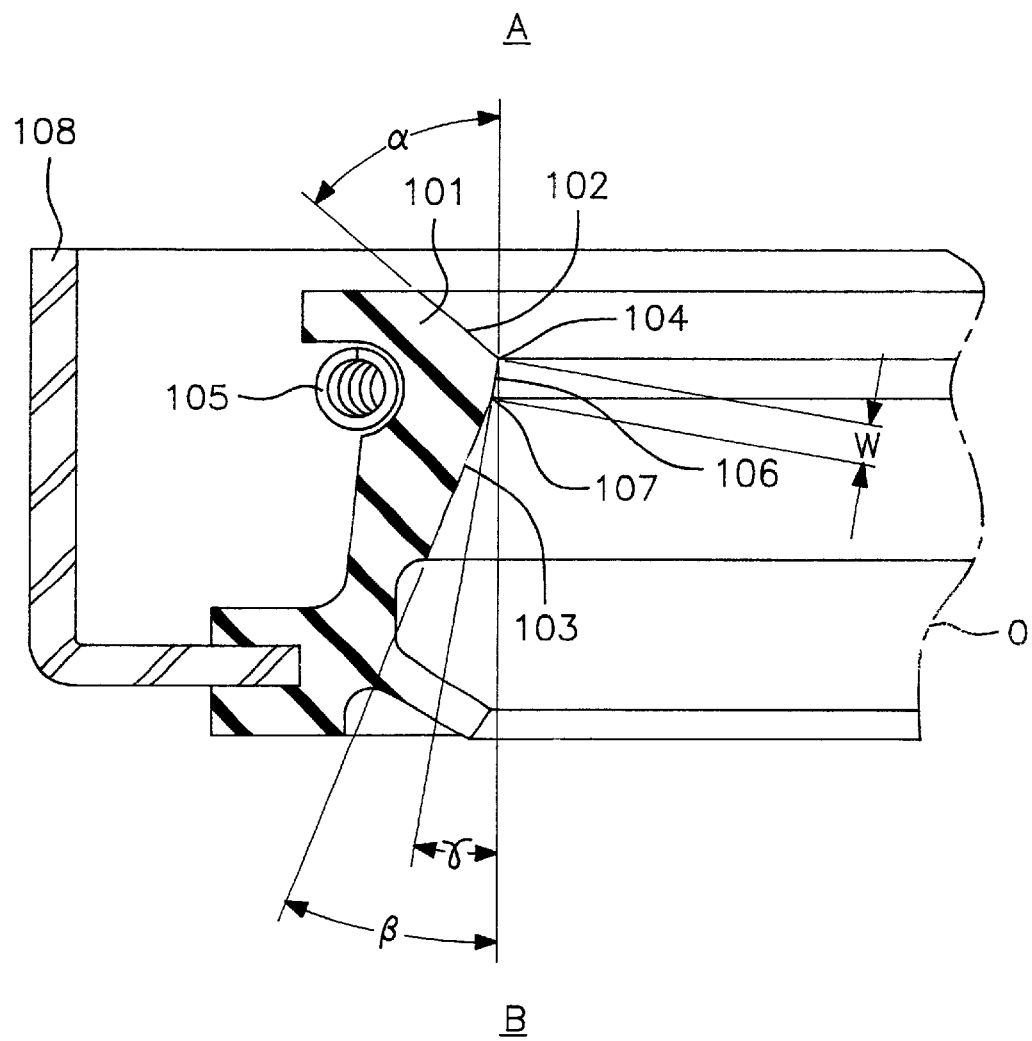
FIG. 16 is a fragmentary cross-sectional view showing another conventional oil seal having a third flat surface.

The second helical ribs can take various size and shape as long as the pumping function is secured. The shape of the second helical ribs is preferably, for example, a mountainous or a bilge or a triangular shape in cross section of C—C line in FIG. 3. Triangular type in cross section of C—C line in FIG. 3 is more preferable because of a mold for this type of oil seal being easy to make. The cross sectional shape in cross section of D—D line in FIG. 3 is also a mountainous or a bilge, or a straight type. FIG. 5A shows, for example, a triangular in shape in cross section of C—C line in FIG. 3. FIG. 5B shows, for example, a bilge type in cross section of D—D line in FIG. 3. FIG. 12, 13 show each perspective view of the bilge type or the mountainous type (FIG. 12), and straight type (FIG. 13) respectively. FIG. 14 shows one of a variation of mountainous or bilge type second helical pumping ribs having about somewhat symmetrical shape in long direction.

The top opening angle θ4 of the second helical ribs 10, as shown in FIG. 5A, is in the range of about 90° to 150°, through almost its entire length of the ribs, preferably in the range of 100° to 140°. The top opening angle θ4 of the ribs, which are shown in FIG. 12, 13 and 14, are also in the same range as mentioned above.

The second helical ribs have a predetermined controlled height h2 at the highest point thereof, as shown in FIG. 5A, as measured from the frustoconical air-side surface 3; and the range of the height h2 is about 0.005 mm to 2 mm or more, preferably 0.1 mm to 2 mm. When the height of the second ribs is not more than 0.005 mm, pumping function to pump oil back to the oil-side A is small. The height h2 can be increased until the top of the ribs reaches the shaft 21 when the oil seal is fitted on the shaft 21.

The shape of the second helical ribs 10 in FIG. 3 is a mountainous or bilge type, and the width and the height of the ribs gradually increase from the oil-side A to the air-side B until the highest portion of h2, and thereafter somewhat rapidly decrease to become zero at the outermost point 10b. The number of ribs 10 is the same of the first helical ribs 6, and placed approximately same direction of the first helical ribs as shown in FIG. 3. The number of the second helical ribs 10, however, can be any number, as long as the pumping function is secured.

One of the example of the second helical ribs of the second embodiment of the present invention is as follows;

Inner diameter of the seal lip: 33 mm
Width W2 of the frustoconical surface: 1.7±0.2 mm
Configuration of the ribs: bilge type,
Cross sectional shape of C—C line of the ribs: triangular
Angle θ3 of the ribs with the edge 4b: 30±2°,
Maximum height h2 of the ribs: 0.200±0.005 mm
Top opening angle θ2 of the top of the ribs: 120±5°,
Pitch of the helical ribs relative to each other: 1.04±0.1 mm, and
The number of the ribs: 50.

On the outer periphery of the seal lip 1, a groove 7 is formed to accommodate a conventional garter spring 8, which gives a predetermined interference to the seal lip 1 when the seal lip is mounted on the shaft 21. There is also a conventional dust lip 9 at the inner peripheral portion of the base portion 6.

Seal lip is usually made of elastic composite materials such a compound as rubber like materials containing fillers.

When the oil seal having such a configuration as mentioned above is fitted on the outer periphery of the shaft 21, the third flat surface 4 sealingly contacts, with predetermined width W in the direction of the axis of the shaft 21, with the outer surface of the shaft 21. Thereby, relatively large contact area with the shaft 21 can be attained by the existence of the flat surface 4, bringing contact pressure per unit area of the third flat surface into relatively low. This contact condition is just like one that can be attained after the conventional seal lip without the third flat surface is used on and abraded by the shaft 21, for a sufficient long operating time, to give a fully (saturatedly) abraded seal lip. Thereby further abrasion of the third flat surface by the shaft 21 is not likely to be occurred easily, and a stable and snug contact condition between the flat surface and the shaft 21 can be attained, resulting in good sealing condition.

Furthermore, as the first pumping helical ribs 6, which have a property to pump oil back to the oil-side A, are provided on the third flat surface 4 having an excellent anti-abrasion property in its configuration mentioned above, the first helical ribs are also difficult to be abraded, thereby pumping function by the first helical ribs can be maintained for a relatively long time in use.

From above mentioned reasons, preventing pumping property of the third helical ribs from being deteriorated for a relatively long period in use can be achieved, thereby excellent sealing property of this type of oil seals can be maintained for a long period of time in use.

Furthermore, because not only the first helical ribs 6 are provided on the third flat surface 4, but also the second helical ribs 10 are provided on the frustoconical air-side surface, even in the case after the first helical ribs are consumed by abrasion between the third flat surface 4 and the shaft 21, pumping function by the second helical ribs on the frustoconical surface is remained, resulting in providing the oil seals with more excellent sealing properties for a long period of time as well as its initial stage in use.

Third Embodiment

Figure 6:
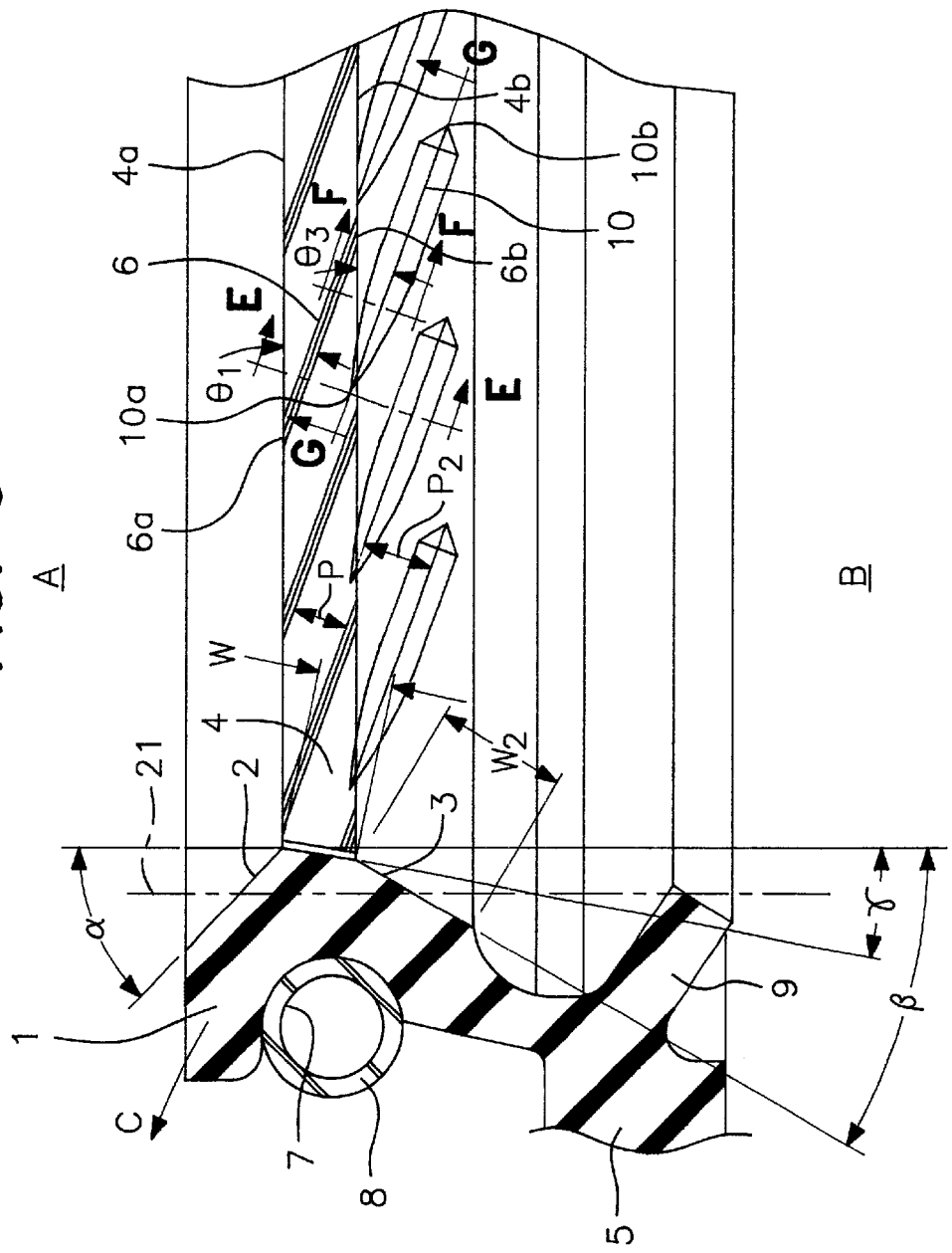
FIG. 6 is a fragmentary cross-sectional view showing another embodiment of the oil seal made according to the present invention.
Figure 7:
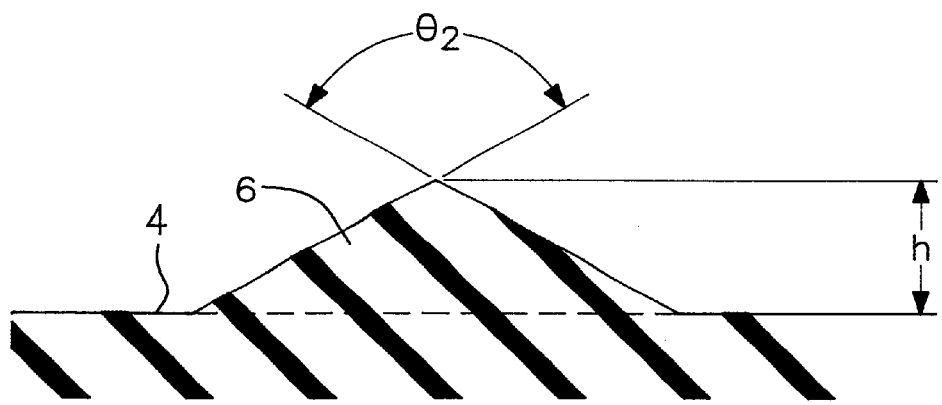
FIG. 7 is a cross-sectional view showing the first rib taken along the line E—E of FIG. 6.

FIG. 6, FIG. 7, FIG. 8A and FIG. 8B show third embodiment of the present invention. Same reference numerals are used as in FIG. 3 to FIG. 5B except some reference numerals. As shown in FIG. 6, the third embodiment is similar to the second embodiment except the location of the second helical pumping ribs. Namely, the first helical pumping ribs 6 are the same as in FIG. 6 of the second embodiment in the shape and the dimension as well as in the number of the ribs, as shown in FIG. 6 and FIG. 7. And the angle α, β and γ are similar to that of the first and second embodiment.

It is also possible that all or some of the first helical ribs 6 can be placed in a reverse direction with an angle (namely 180-θ1) to the edge line 4a. If some of the first helical ribs 6 is placed in a reverse direction relative to the rest of the first helical ribs, pumping function can be effectively secured even when the shaft 21 rotates in reverse direction.

And each of all these first helical ribs does not cross over relative to each other.

Figure 8A:
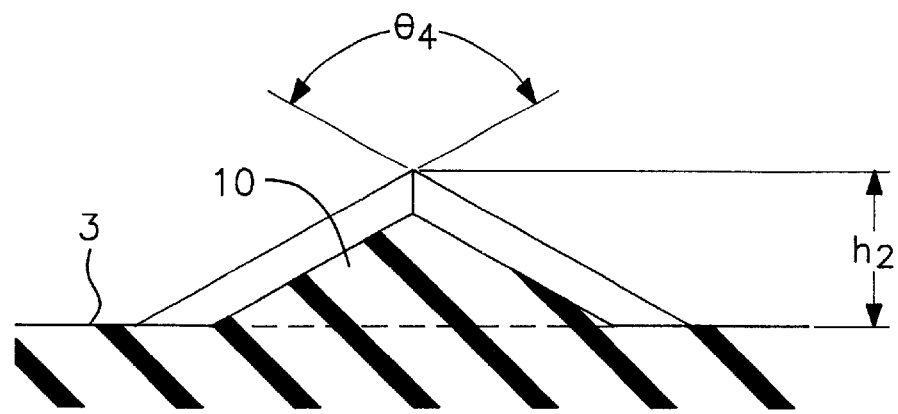
FIG. 8(A) is a cross-sectional view showing the second rib taken along the line F—F of FIG. 6.
Figure 8B:
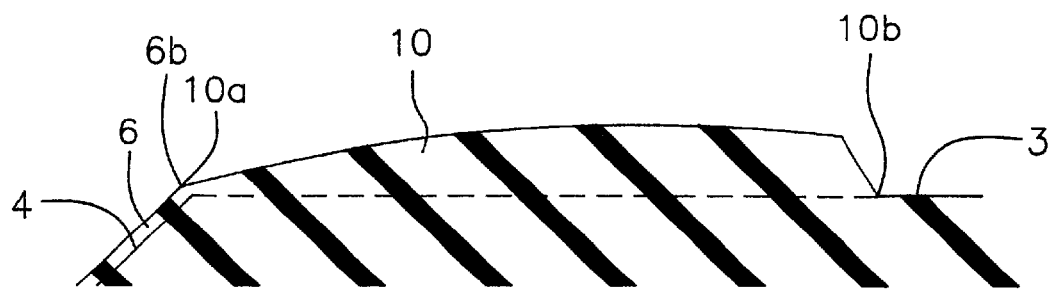
FIG. 8(B) is a cross-sectional view showing the second rib taken along the line G—G of FIG. 6.

In the third embodiment, the second helical pumping ribs are placed in a manner that one end portions of the ribs 10a on the edge line 4b are not integrally connected to the end portions 6b of the first helical ribs, in other words, the end portion 10a of the second helical ribs 10 are placed between the end portions 6b and 6b of the first helical ribs 6 and 6 as shown in FIG. 6. The edge portions 10a of the second helical ribs 10 start at around the edge line 4b, and the cross sectional shape of the line F—F is a triangular type similar to that of the second embodiment as shown in FIG. 8A. The top opening angle θ4 and the maximum height are also similar to that of FIG. 5A of the second embodiment. The cross sectional shape of the line G—G is a helical one as is shown in FIG. 8B. The outermost tip portion 10a of the second ribs 10 are preferably integrally formed on the third flat surface to fully secure, even at the initial stage in use, the pumping function of the second ribs on the frustoconical air-side surface. But if the outermost tip in the end portion 10a can be accurately made on the edge line 4b, the pumping function may be also secured. At this latter case, however, the working to make a mold (not shown) for oil seals becomes somewhat meticulous. The shape of the second helical ribs 10 of the third embodiment can be similar to the second embodiment, as shown in FIG. 12, FIG. 13 and FIG. 14 except the shape of the tip 10a of the ribs 10.

Since the first helical pumping ribs 6 on the third flat surface 4 and the second helical pumping ribs 10 on the frustoconical air-side surface 3 are placed in a manner that all of each two ribs 6, 10 are not exactly continuously connected each other at their end portions 6b, 10a, therefore processability for making a mold (not shown) of this type of seal lip 1 is better than that of the Second embodiment.

Fourth Embodiment

FIGS. 9, 10, 11A and 11B show fourth embodiment of the present invention. Same reference numerals are used as in FIGS. 6, 7, 8A and 8B except some reference numerals.

As shown in FIG. 9, in the tip (inner peripheral portion) of the seal lip 1, a frustoconical oil-side surface 2, inner diameter of which gradually increasing toward oil-side A, a frustoconical air-side surface 3, inner diameter of which gradually increasing toward air-side B, are provided. Between both surfaces 2 and 3, a third substantially frustoconical (or flat) surface 4 having a predetermined width W in actual size as shown in FIG. 9. The third flat surface sealingly engages with the shaft 21 in use.

In FIG. 9, the flat surface 4 is shown, as is mentioned above in the first embodiment, like a frustoconical surface having a diameter thereof gradually increasing from the oil-side A to the air-side B. This configuration depends on the fact that the oil seal is not fitted on the member (shaft) 21, so the seal lip 1 is in a free state. When the oil seal is fitted on the shaft 21 to be sealed, the seal lip 1 is moved toward C axis around a support portion 5, which is supported by a rigid annular casing (not shown), by the interference between the shaft 21 and the seal lip 1 in FIG. 9, thereby resulting a fully contact of the whole flat surface 4 with the shaft 21 to bring the frustoconical shape of the flat surface 4 into a cylindrical shape.

As is described in the first embodiment, according to the experiments of the present invention, in the free state of the fourth embodiment, each preferable angle of α, β and γ, which are shown in FIG. 9, is as follows as is mentioned in the first embodiment. A preferable angle a between the central axis of the oil seal and the frustoconical oil-side surface 2 was in the range of about 40° to 60°, a preferable angle β between the central axis of the oil seal and the frustoconical airside surface 3 was in the range of about 15° to 30°, a preferable angle γ between the central axis of the oil seal and the third flat surface 4 was in the range of about 5° to 15°, as is shown in FIG. 3. When an oil seal having an inside peripheral diameter of the seal lip 1 of 33 mm was used, the width W of the third flat surface 4 in the direction of the central axis of the oil seal was preferably about 0.1 mm to 1.5 mm in actual size. A width of the third flat surface may be made wider with increasing an inside diameter of a seal lip 1 of an oil seal.

On the third flat surface 4, first helical ribs 6 and 6' to pump oil (or fluid, not shown) back to the oil-side A are formed, integrally with and on the third flat surface 4. Unlike the first, second and third embodiment, each first rib or a group of a plurality of the first rib are placed alternately and evenly in a manner that the slope of a rib or a group of a plurality of rib is reverse relative to each other or relative to each group of a plurality of the rib (in FIG. 9, each first rib is placed alternately in reverse manner). All of each rib or each group of a plurarilty of the rib are preferably placed at approximately even intervals on around the third flat surface.

One end portion 6a or 6'a of the first helical ribs 6 or 6' start at around the edge line 4a and extend toward the edge line 4b aslant the third flat surface to reach to the other end portion 6b at around the edge line 4b. It is more desirable, for securing better pumping function of the helical ribs, that each end portions 6a or 6'a and 6b or 6'b is on the edge line 4a or 4b respectively. When the first helical ribs start far from the edge line 4a or far from the edge line 4b, pumping function to pump oil back to the oil-side A can not be fully secured.

The angle θ1 and θ1 between the edge 4a and the ribs 6 and 6', as shown in FIG. 9, is in the range of about 10° to 45°, preferably of about 15° to 40°. In the case the angle is not more than about 10°, there is often some oil (or fluid) leakage from the oil-side A to the air-side B through the portion between the shaft 21 and the third flat surface 4 at the time of reverse revolution of the shaft 21.

The shape of the first helical ribs can be, for example, a mountainous or a bilge or a triangular shape in cross section of H—H line of FIG. 9, triangular shape which is shown in FIG. 4, is, however, preferable throughout its entire length. The shape of the ribs 6' is also the same shape as that of the ribs 6.

When rectangular type ribs with approximately same base length and height as that of a triangular type ribs were provided instead of a triangular type or the like mentioned above, on the third flat surface, there sometimes occurred some oil leakage through, at the time that there is no relative movement between the seal lip and the shaft 21. Probably there might be a small clearance, which might cause oil leakage, near the base of the rectangular ribs on the third flat surface, probably due to lesser deformation in the rectangular ribs when the seal lip was mounted on the shaft 21.

Figure 10:
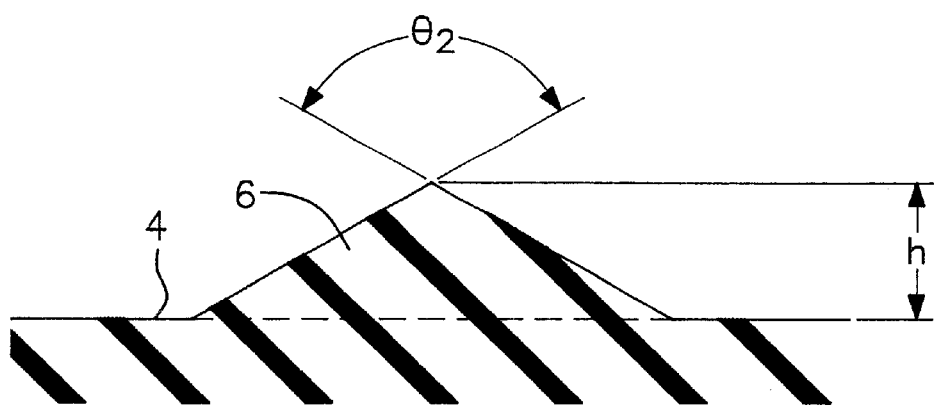
FIG. 10 is a cross-sectional view showing the first rib taken along the line H—H in FIG. 9.

The top opening angle θ2 of the substantially triangular shaped ribs 6 and 6', as shown in FIG. 10, is in the range of about 90° to 150° preferably in the range of 100° to 140°.

The first helical ribs 6 and 6' have a predetermined controlled height throughout the length thereof, as measured from the third flat surface 4, and the range of the height h, which is shown in FIG. 10, is about 0.005 mm to 0.1 mm, preferably 0.005 mm to 0.08 mm. When the height of the ribs h is not more than 0.005 mm, pumping function to pump oil back to the oil-side A is small. On the other hand the height of the ribs h is not less than 0.1 mm, there is often some oil leakage through the portion between the third flat surface 4 and the shaft 21 at the time that there is no relative movement between the seal lip and the shaft 21, or at the time the shaft is rotating in reverse direction.

One of the example of the first helical ribs of the fourth embodiment of the present invention is as follows;

Inner diameter of the seal lip: 33 mm

Width W of the third flat surface: 0.3±0.2 mm

Configuration of the ribs: triangular,

Angle θ1 of the ribs with the edge 4a: 30±2°,

Height h of the ribs: 0.050±0.005 mm

Top opening angle θ2 of the top of the ribs: 120±5°,

The number of unit: 8,

The number of the ribs in each unit: 16,

Total number of the ribs: 128, and

Pitch of the ribs relative to each other in the plurality of ribs in the unit: 0.7±0.1 mm.

The term "unit" mentioned above represents a pair of a rib or a pair of a group of a plurality of rib, consisting of a rib or ribs 6 having a slope in a normal direction, and of a rib or ribs 6' having a slope in a reverse direction as is shown in FIG. 9. Each rib in each group of a plurality of rib of the unit is placed in an approximately same direction and placed in a parallel manner relative to each other.

This first helical pumping ribs 6' on the third flat surface 4, also, have a pumping function to pump oil back to the oil-side A at the time when the shaft 21 is rotating in reverse direction.

Thereby, this type of oil seal has a property that, even when the shaft drives in a reverse revolution these ribs pump oil back to the oil-side as well as the time the shaft drives in a normal revolution.

In the fourth embodiment, on the frustoconical air-side surface 3, mountainous or bilge or triangular shape helical ribs 10 having a pumping function to pump oil (or fluid, not shown) back to the oil-side A are further provided, integrally on the frustoconical air-side surface, in a parallel manner relative to each other, and placed at approximately even intervals relative to each other on and around the frustoconical airside surface 3, as shown in FIG. 9. This second helical pumping ribs provide, also, the seal lip 1 with a further pumping function to pump oil back to the oil-side A, similar to the first helical pumping ribs 6 on the third flat surface 4.

Furthermore, the second helical pumping ribs provide the seal lip 1 with a pumping function even after the first helical pumping ribs disappeared, in the case of heavy abrasion by the shaft 21, from the third flat surface 4, giving the seal lip 1 a stable pumping function for a long time as well as its initial stage in use.

The second helical pumping ribs are placed on the frustoconical air-side surface in a manner that one end portions 10a of the ribs 10 on around the edge line 4b are not necessarily integrally connected to the end portions 6b or 6'b of the first helical ribs 6 pr 6', in other words, the end portion 10a of the second helical ribs 10 can be placed at the place between the end portions 6b, 6b, 6'b and 6'b of the first helical ribs 6 or 6'. The edge portions 10a of the second helical ribs 10 start at around the edge line 4b and extends toward the air-side B, with gradually increasing in height and width at least at an initial portion near the edge line 4b. When the second helical ribs start at far from the edge line 4b, the good pumping function to pump oil back to the oil-side A can not be sometimes secured. And the end portion of the second helical ribs 10 is located within, and at near the edge of the air-side of, the frustoconical air-side surface 3, as shown in FIG. 9.

The second helical ribs are placed aslant the width W2 of the frustoconical air-side surface 3.

The angle θ3 between the edge line 4b and the central line of the long direction of the second helical ribs, as shown in FIG. 9, is in the range of about 10° to 45°, preferably of about 15° to 40°. In the case the angle θ3 is not more than about 10°, there often shows a small additional pumping function other than the pumping function by the first helical ribs 6, 6', at the early stage in use as well as after the long period in use. On the other hand when the angle θ3 is not less than about 45°, the additional pumping function other than the pumping function by the first helical ribs 6 or 6' often becomes small.

The second helical pumping ribs can be placed in a reverse direction as long as the range of the angle θ3 is within 10° to 45° (namely 180-θ3), as mentioned above.

Figure 11A:
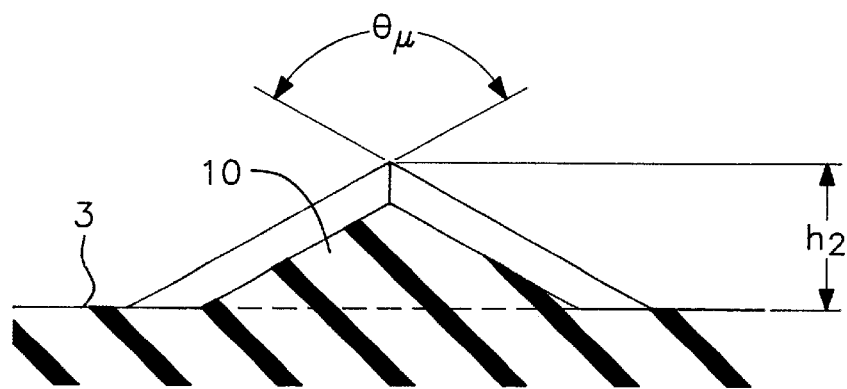
FIG. 11(A) is a cross-sectional view showing the second rib taken along the line I—I in FIG. 9.
Figure 11B:
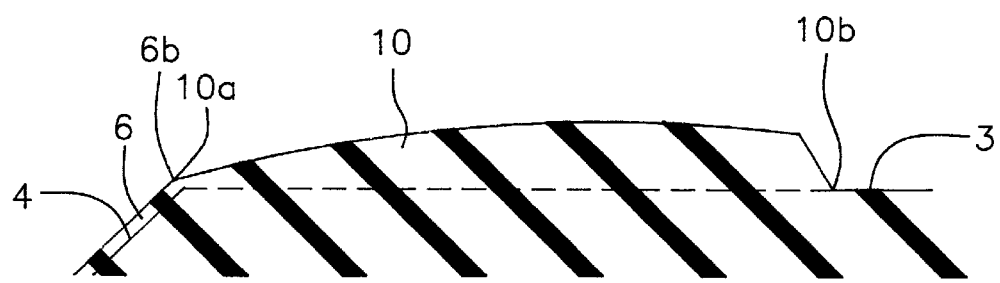
FIG. 11(B) is a cross-sectional view showing the second rib taken along the line J—J in FIG. 9.

The second helical ribs can take various size and shape as long as the pumping function is secured. The shape of the second helical ribs is, for example, a mountainous or a bilge or a triangular shape in cross section of I—I line in FIG. 9. Triangular cross sectional shape in I—I line in FIG. 9 is preferable because of a mold (not shown) having this shape of oil seal being easy to make. The cross sectional shape in cross section of J—J line in FIG. 9 is also a mountainous or a bilge, or a straight type. FIG. 11A shows, for example, a triangular in shape in cross section of I—I line in FIG. 9. FIG. 11B shows, for example, a bilge type in cross section of J—J line in FIG. 9. FIGS. 12, 13 show each perspective view of the bilge type or the mountainous type (FIG. 12), and straight type (FIG. 13) respectively. FIG. 14 shows one of a variation of mountainous or bilge type second helical pumping ribs having about somewhat symmetrical shape in long direction. The outermost tips of the portion 10a of the ribs 10 can be connected to the end portion 6b or 6'b of the first ribs 6 or 6' (as shown in FIGS. 12, 13 and 14) or can be placed on the third flat surface as is shown in FIG. 11B.

The top opening angle θ4 of the second helical ribs 10, as shown in FIG. 1A, is in the range of about 90° to 150°, through almost its entire length of the ribs, preferably in the range of 100° to 140°. The top opening angle θ4 of the ribs, which are shown in FIGS. 12, 13 and 14, are also in the same range as mentioned above.

The second helical ribs 10 have a predetermined controlled height h2 at the highest point thereof, as shown in FIG. 11A, as measured from the frustoconical air-side surface 3; and the range of the height h2 is about 0.005 mm to 2 mm or more, preferably 0.1 mm to 2 mm. When the height of the second ribs is not more than 0.005 mm, pumping function to pump oil back to the oil-side A is small. The height h2 can be increased until the top of the ribs reaches the shaft 21 when the oil seal is fitted on the shaft 21.

The shape of the second helical ribs 10 in FIG. 9 is a mountainous or bilge type, and the width and the height of the ribs gradually increase from the oil-side A to the air-side B until the highest portion of h2, and thereafter somewhat rapidly decrease to become zero at the outermost point 10b. The number of ribs 10 can be taken any number. These ribs are usually placed evenly on the frustoconical air-side surface.

One of the example of the second helical ribs of the fourth embodiment of the present invention is as follows;
Width W2 of the frustoconical surface: 1.85±0.2 mm
Configuration of the ribs: bilge type,
Cross sectional shape of I—I line of the ribs: triangular
Angle θ3 of the ribs with the edge 4b: 20±2°,
Maximum height h2 of the ribs: 0.200±0.005 mm
Top opening angle θ2 of the top of the ribs: 120±5°,
Pitch of the helical ribs relative to each other: 0.71±0.1 mm, and
The number of the ribs: 50.

On the outer periphery of the seal lip 1, a groove 7 is formed to accommodate a conventional garter spring 8, which gives a predetermined interference to the seal lip 1 when the seal lip is mounted on the shaft. There is also a conventional dust lip 9 at the inner peripheral portion of the base portion 6.

Seal lip is usually made of elastic composite materials such as a compound comprising rubber like material and filler.

When the oil seal having such a configuration as mentioned above is fitted on the outer periphery of the shaft 21, the third flat surface 4 sealinly, with predetermined width W in the direction of the axis of the shaft 21, contacts with the outer surface of the shaft 21. Thereby, relatively large contact area with the shaft 21 can be attained by the existence of the flat surface 4, bringing contact pressure per unit area of the third flat surface into relatively low. This contact condition is just like one that can be attained after the conventional seal lip without the third flat surface is used on and abraded by the shaft 21, for a sufficient operating time, to give a fully (saturatedly) abraded seal lip. Thereby further abrasion of the third flat surface by the shaft 21 is not likely to be occurred easily, and a stable and snug contact condition between the flat surface and the shaft 21 can be attained, resulting in a good sealing condition.

Furthermore, as the first pumping helical ribs 6, 6' which have a property to pump oil back to oil-side A, are provided on the third flat surface 4 having an excellent anti-abrasion property in its configuration mentioned above, the first helical ribs are also difficult to be abraded, thereby pumping function by the first helical ribs can be maintained for a long time in use. From above mentioned reasons, preventing pumping property of the third helical ribs from being deteriorated for a relatively short period in use can be achieved, thereby excellent sealing property of this type of oil seals can be maintained for a long period of time as well as at its initial stage in use.

Furthermore, because not only the first helical ribs 6 are provided on the third flat surface 4, but also the second helical ribs 10 are provided on the frustoconical air-side surface, even in the case after the first helical ribs is consumed by abrasion which is occurred at the portion between the third flat surface 4 and the shaft 21, pumping function by the second helical ribs on the frustoconical air-side surface is remained, thereby resulting in providing oil seals with more excellent sealing properties for a long period of time as well as its initial stage in use.

Moreover, since the first helical pumping ribs 6 on the third flat surface 4 and the second helical pumping ribs 10 on the frustoconical air-side surface 3 are placed in a manner that all of each two ribs 6, 10 are not exactly continuously connected each other, therefore processability for making a mold (not shown) of this type of seal lip 1 can be comparatively improved.

And, since the first helical pumping ribs 6' on the third flat surface 4 are placed in a reverse direction with respect to the angle between the edge line 4a and the first helical pumping ribs 6, pumping function can be secured even when the shaft 21 rotates in a reverse direction.

In order to secure sealing function at the time the shaft 21 rotates in reverse direction, there are other method such as those decreasing the height h of the first helical pumping ribs 6 or decreasing the number of the first helical pumping ribs 6; it is, however, more preferable to provide some of the first helical pumping ribs 6' placed in a reverse direction, to secure the pumping function and to secure sealing function as well.

The shapes of the second helical pumping ribs 10 mentioned above are only preferable several examples of the present invention and are therefore not limited to these embodiments. The cross sectional shape of the second helical ribs can be any type, and the height and the width of the second helical pumping ribs 10 can be formed somewhat uniformly through their entire length as long as the pumping function is secured.

Effect of the Present Invention

The oil seals of the present invention provide an excellent anti-wearability and an excellent stability in sealing functions in a long period of time as well as in its initial stage in use, due to the existence of, on an inner periphery of a seal lip, a so-called third flat surface 4 similar to just like one (like a fully saturatedly abraded seal lip) that is obtained after a conventional seal lip without the so-called flat surface is used on and abraded by a shaft 21, for a sufficient operating time. A larger contact area with the shaft 21 are there in this so-called third flat surface 4, due to the existence of the so-called third flat surface 4, resulting in sufficiently low contact pressure thereof per unit area of the so-called third flat surface.

Thereby, further abrasion of the so-called third flat surface 4 by the shaft 21 to be sealed is not easily to be occurred, and a stable and snug contact condition between the so-called third flat surface 4 and the shaft 21 can be achieved, resulting in a good sealing condition.

Furthermore, as a first pumping helical ribs, which have a property to pump oil back to an oil-side A, are provided on the so-called third flat surface having an excellent anti-abrasion property due to its configuration mentioned above, the first helical ribs are also difficult to be abraded, thereby pumping function by the first pumping helical ribs on the so-called third flat surface can be maintained for a long time in use.

The first pumping helical ribs are so designed to be deformed due to their configuration when the oil seal is fitted on the shaft 21, that the so-called third flat surface with the first pumping helical ribs is brought into a snuglly engaging condition with the shaft 21, resulting in preventing oil leakage from the oil-side to an air-side through the contact portion between the so-called third flat surface and the shaft 21 even at the time the shaft 21 is not rotating.

From above mentioned reasons, preventing the oil seal, for a long period of time in use, from being deteriorated in pumping property of the so-called third flat surface having the first helical pumping ribs, can be achieved. And this excellent sealing property of this type of oil seals can be maintained for a long period of time as well as at their initial stage in use.

Moreover, because not only the first helical ribs 6 are provided on the so-called third flat surface 4, but also a second helical ribs 10 are provided on the frustoconical air-side surface, even in the case after the first helical ribs 6 is consumed by abrasion which is occurred at the portion between the so-called thied flat surface 4 and the shaft 21, pumping function by the second helical ribs on the frustoconical air-side surface is remained, thereby resulting in providing oil seals with more excellent sealing properties for a long period of time as well as its initial stage in use.

Still moreover, when some of the first helical pumping ribs are placed in a reverse direction with respect to the angle between the edge line 4a and the first helical pumping ribs, oil leakage from the oil-side to the air-side can be effectively prevented at the time the shaft 21 is rotating in reverse direction.

What is claimed is:

1. An oil seal having a seal lip, said seal lip comprising:
    a frustoconical air-side surface on an air-side inner periphery of said seal lip;
    a frustoconical oil-side surface on an oil-side inner periphery of said seal lip;
    a third surface having a predetermined width in a direction of a central axis of said oil seal, said third surface being placed between said frustoconical air-side surface and said frustoconical oil-side surface;
    a plurality of first helical pumping ribs integrally formed on said third surface extending continuously between opposed edges of said third surface, said plurality of first helical pumping ribs being spaced apart and free of interconnection; and
    a plurality of second helical pumping ribs located on said frustoconical air-side surface;
    said third surface snugly contacting with a shaft to be sealed with substantially a full surface of said third surface, to bring said third surface into a cylindrical shape when said oil seal is fitted on said shaft in use.

2. An oil seal according to claim 1, wherein each of said first helical pumping ribs is placed at a predetermined angle ($\theta 1$) to an edge line between said frustoconical oil-side surface and said third surface.

3. An oil seal according to claim 2, wherein some of said first helical pumping ribs are placed at a predetermined angle $180-\theta 1$ to said edge line.

4. An oil seal according to claim 1, wherein each of said first helical pumping ribs has a uniform cross-section having a predetermined height throughout a length thereof.

5. An oil seal according to claim 4, wherein said fist helical pumping ribs have a triangular shape in cross-section.

6. An oil seal according to claim 1, wherein said third surface has a frustoconical shape in its free state, a diameter of which gradually becomes larger from an oil-side to an air-side.

7. An oil seal according to claim 1, wherein said second helical pumping ribs have at least a portion progressively increasing its height from said oil-side to said airside.

8. An oil seal according to claim 1, wherein each of said first helical pumping ribs and said second helical pumping ribs are connected to each other at an edge line located between said frustonical air-side surface and said third surface, and a shape of said second helical pumping ribs is a bilge type.

9. An oil seal according to claim 1, wherein each end of first helical pumping ribs and said second helical pumping ribs are placed alternately at an edge line located between said frustonical air-side surface and said third surface.

10. An oil seal according to claim 1, further comprising said second helical pumping ribs on said frustoconical air-side surface, a shape of said second helical pumping ribs being a bilge type.

* * * * *